(12) United States Patent
Zhang et al.

(10) Patent No.: US 11,101,764 B2
(45) Date of Patent: Aug. 24, 2021

(54) DYNAMIC CONTROL OF SOURCE CURRENT IN ELECTRIC MOTOR DRIVE SYSTEMS

(71) Applicant: Steering Solutions IP Holding Corporation, Saginaw, MI (US)

(72) Inventors: Zhe Zhang, Fenton, MI (US); Prerit Pramod, Saginaw, MI (US); Krishna Namburi, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/684,334

(22) Filed: Nov. 14, 2019

(65) Prior Publication Data

US 2021/0152115 A1    May 20, 2021

(51) Int. Cl.
*H02P 27/06* (2006.01)
*H02P 6/08* (2016.01)
*H02K 1/27* (2006.01)
*B62D 5/04* (2006.01)

(52) U.S. Cl.
CPC ............ *H02P 27/06* (2013.01); *B62D 5/0463* (2013.01); *H02K 1/2706* (2013.01); *H02P 6/08* (2013.01)

(58) Field of Classification Search
CPC .......... H02P 6/08; H02P 27/06; H02P 29/032; H02P 6/28; B62D 5/046; B62D 5/0463
See application file for complete search history.

(56) References Cited

U.S. PATENT DOCUMENTS

| | | | | |
|---|---|---|---|---|
| 4,446,414 A * | 5/1984 | Tupper | ................... | H02P 25/024 318/723 |
| 6,229,278 B1 * | 5/2001 | Garces | .............. | H02M 7/53875 318/801 |
| 6,953,100 B2 * | 10/2005 | Aberle | ................... | B60W 10/26 429/432 |
| 7,459,874 B2 * | 12/2008 | Bae | ....................... | B60L 15/025 318/623 |
| 7,984,786 B2 * | 7/2011 | Kasai | ................... | B62D 5/0481 180/446 |
| 8,541,965 B2 * | 9/2013 | Ueda | ..................... | H02P 29/032 318/400.02 |
| 9,667,181 B2 * | 5/2017 | Scotson | ................... | H02P 6/28 |
| 9,829,234 B2 * | 11/2017 | Hatakeyama | ........... | H02P 29/62 |
| 10,644,633 B2 * | 5/2020 | Komatsu | ................ | B60L 3/003 |
| 10,717,463 B2 * | 7/2020 | Pramod | ................... | H02P 23/14 |
| 2009/0079375 A1 * | 3/2009 | Suzuki | .................... | H02P 21/22 318/434 |

* cited by examiner

*Primary Examiner* — Thai T Dinh
(74) *Attorney, Agent, or Firm* — Dickinson Wright PLLC

(57) ABSTRACT

An electric motor drive system is provided. It includes a rotor having permanent magnets arranged therein and a stator surrounding the rotor an inverter having switches arranged therein, the switches operable to draw current from a direct current bus and operate the electric machine through windings of the stator and a controller operable to receive a source current limit, IS, and a source voltage limit, VDC, both associated with the direct current bus is also provided. The invertor is responding to a torque demand to operate the switches of the inverter to generate an alternating current corresponding to the torque demand and according to a torque limit defined by a source current torque limit corresponding to the source current limit when the source current torque limit is less than or equal to a source voltage torque limit corresponding to the source voltage limit.

20 Claims, 4 Drawing Sheets

DYNAMIC CONTROL OF SOURCE CURRENT IN ELECTRIC MOTOR DRIVE SYSTEMS

BACKGROUND OF THE INVENTION

The present disclosure relates to the dynamic control of source current in electric power steering systems.

Electric power steering uses electric machines to assist the driver in steering by generating assistance torque. Assistance torque commands draw power from direct current buses as necessary. Unconstrained power availability to electric power steering systems may reduce efficiency and longevity.

Accordingly, it is desirable to limit electric steering power demands.

SUMMARY OF THE INVENTION

An electric motor drive system is provided. It includes a rotor having permanent magnets arranged therein and a stator surrounding the rotor an inverter having switches arranged therein, the switches operable to draw current from a direct current bus and operate the electric machine through windings of the stator and a controller operable to receive a source current limit, IS, and a source voltage limit, VDC, both associated with the direct current bus is also provided. The invertor is responding to a torque demand to operate the switches of the inverter to generate an alternating current corresponding to the torque demand and according to a torque limit defined by a source current torque limit corresponding to the source current limit when the source current torque limit is less than or equal to a source voltage torque limit corresponding to the source voltage limit.

An electric motor drive system having permanent magnets arranged therein and a stator surrounding the rotor is provided. An inverter has switches operable to draw current from a direct current bus and operate the electric machine through windings of the stator. A controller is operable to receive a source current limit, IS, and a source voltage limit, VDC, both associated with the direct current bus, and is responsive to a torque demand to operate the switches of the inverter to generate an alternating current corresponding to the torque demand and according to a torque limit defined by a source current torque limit equal to a first quadrature current root, IqS1, a positive root of a source power limit equation having a direct current component root based on a source voltage limit equation when a quadrature current component is zero that is less than a first quadrature voltage root, IqV1, and based on a source voltage limit equation and a second quadrature current root, IqS2, based on the source power limit equation is less than a second quadrature voltage root, IqV2, based on the source voltage limit equation.

A controller readable storage medium having program instructions embodied thereon is provided. The controller receives a source current limit, IS, and a source voltage limit, VDC, both associated with a direct current bus and receives a torque demand and operates switches of an inverter to generate an alternating current corresponding to the torque demand and according to a torque limit defined by a source current torque limit corresponding to the source current limit when the source current torque limit is less than or equal to a source voltage torque limit corresponding to the source voltage limit.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting the same.

Figure 1:
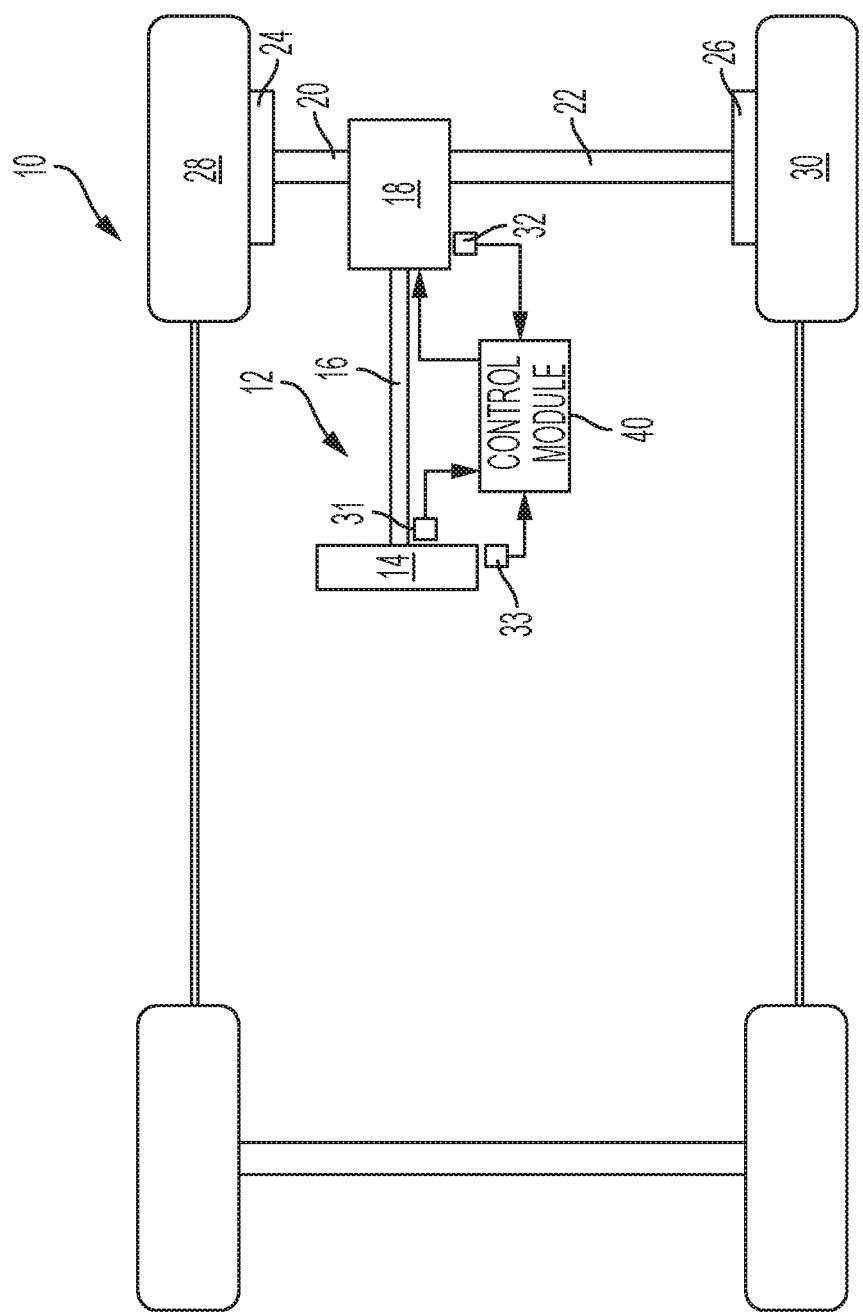
FIG. 1 illustrates a steering system having current control in accordance with one aspect of the invention.

Referring to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31-33 that detect and measure observable conditions of the steering system 12 and/or of the vehicle 10. The sensors 31-33 generate sensor signals based on the observable conditions. In various embodiments, the sensors 31-33 include, for example, a motor position sensor. In one embodiment, the motor position sensor is an analog position sensor that generates signals representing the sine and cosine of the motor shaft angle. The motor position sensor sends the signals to the controller 40.

In various embodiments, a controller 40 controls the operation of the steering system 12 and/or the vehicle 10 based on one or more of the sensor signals and further based on error detection system and method of the present disclosure.

The controller or controllers may include any combination of processors, field programmable gate arrays (FPGA), or application specific integrated circuits (ASIC). The controller may include memory, volatile and non-volatile, operable to store machine instructions from the processors and other processing mechanisms to receive, calculate, and control devices, as necessary. Machine instructions may be stored in any language or representation, including but not limited to machine code, assembly instructions, C, C++, C#, PASCAL, COBAL, PYTHON, JAVA, and RUBY. It should be appreciated that any type of wired or wireless configuration is appreciated for any of the communications from the controller. Wireless protocols such as ZIGBEE, WI-FI, BLUETOOTH, or any other implement may be used. Communications may be realized through any protocol or medium known or unknown at the time of filing.

The controller 40 may include, in memory or operating in memory, a controller program product distributed as an implementation of teachings described herein. The controller program product of controller 40 may be operable to perform particular steps and actions described herein based on control system inputs and operator actions. For example, the operator actions on the handwheel 14 may change or alter the way the computer program product operates the electric machine 18 and associated actuators and mechanisms. That is, the teachings herein improve the operation of steering systems, steer by wire systems, and electric power steering systems. The teachings herein also improve the operation of controllers 40 by improving efficiency of operation and implementing methods that provide the described operations.

Figure 2:
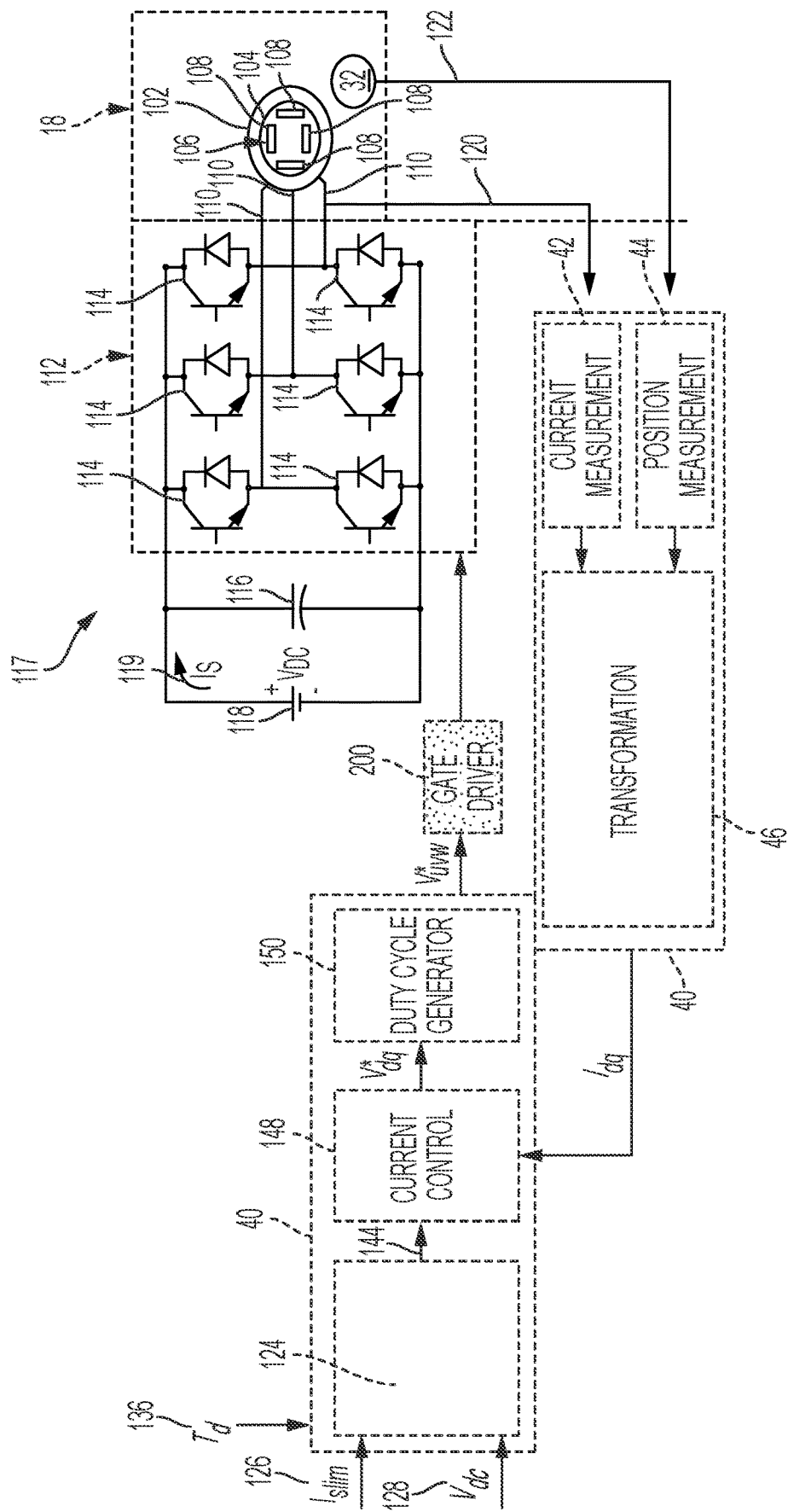
FIG. 2 illustrates a controller and bus associated with another aspect of the invention.

Referring to FIG. 2, the controller 40 includes methods for driving switches 114 of an inverter 112 to operate an electric machine 102. The electric machine 102 includes a stator 104 being wound with one or more phases 110. The stator 104 surrounds a rotor 106. The rotor 106 includes permanent magnets arranged therein. It should be appreciated that any number of phases, magnets, and configurations thereof may be used. The electric machine 102 may drive a pinion and rack assembly (not shown). The inverter 112 may be associated with a direct current bus 117 including a DC link capacitor 116 and a voltage source 118 or battery 118 configured to drive a direct current 119 on the direct current bus 117. The direct current bus 117 may only be associated with the battery 118 and receive energy from any number of sources. For example, the direct current bus 117 may be supplied by a DC to DC converter or an alternator or regenerative bus. Regardless, the direct current bus 117 is driven by direct current $I_S$ 119. The controller 40 may include pulse width modulation (PWM) outputs from a PWM controller 150 to drive gate drivers that operate gates of the switches 114. The switches 114 form pairs or phase legs that provide independent electric phases 110 to the electric machine 102.

The PWM outputs from PWM controller 200 controlled by phase voltage requests from a current controller 148 and a duty cycle generator 150. The current controller 148 receives estimated or measured direct-quadrature currents $I_{dq}$ from the feedback current measurements from the phase legs 110 associated with the electric machine 102 via the current measurement block 42 and the position measurement 44 from the position sensor 32 and feedback conduit 122. Inputs to the current controller 148 are the estimated or measured direct-quadrature currents $I_{dq}$ from a transform 46 and a direct-quadrature current command, $I_{dq}*$, 144. Control method 124 receives a current limit, $I_{slim}$, 126, and voltage limit, $V_{DC}$, 128. $I_{slim}$ 126 and $V_{DC}$ 128 may be associated with the direct current bus 117. That is, the direct current bus 117 or other associated components may impose restrictions on the current and voltage available. For example, dynamic or arbitrary current limit $I_{slim}$ 126 may be sent to the controller 40 to limit current on the direct current bus 117 according to operating modes of a vehicle. If the vehicle is in a long range or low power mode, $I_{slim}$ 126 may be dynamically adjusted from maximum operating parameters. Given such limits, $I_{slim}$ 126 and $V_{DC}$ 128 have respective torque limit curves 130 and 132 respectively. As shown in the formulas or Equations, identified as (1)-(5) below, voltage and current in the direct-quadrature reference frame are given.

$$V_d = RI_d + \omega_e L_q I_q \quad (1)$$

where $\omega_e$ is the electrical speed of the electric machine 102, $L_q$ is the quadrature axis inductance of the electric machine 102, and R is the resistance of the electric machine 102.

$$V_q = RI_q + K_e \omega_m - \omega_e L_d I_d \quad (2)$$

where $K_e$ is a back electromagnetic force constant of the electric machine 102, $\omega_m$ is a mechanical speed of the electric machine 102, and $L_d$ is a direct axis inductance of the electric machine 102.

$$T_e = \tfrac{3}{2} K_e I_q + \tfrac{3}{2} N_p (L_q - L_d) I_d I_q \quad (3)$$

where Equation (3) is a torque equation, and $T_e$ is a torque of the electric machine 102, and $N_p$ is a number of poles of the electric machine 102.

$$V_d^2 + V_q^2 \leq \frac{V_{DC}^2}{3} \quad (4)$$

$$\frac{3}{2}(V_d \cdot I_d + V_q \cdot I_q) = V_{DC} \cdot I_S - R_{DC} \cdot I_S^2 \quad (5)$$

where Equation (4) is a source voltage limit constraint associated with the electric machine 102 and Equation (5) is a source power equation associated with the electric machine 102 and $R_{DC}$ is the resistance of the bus between the DC link capacitor 116 and the input of the inverter.

Manipulation of these equations provides respective current and voltage torque limit curves 130, 132. That is, given a supply current limit $I_{slim}$ 126, a torque limit curve using the source power expression in Equation (5) is determined. Respective direct and quadrature voltages, $V_d$ and $V_q$, are replaced with equivalents from Equations (1) and (2) in Equation (5) to form Equation (6).

$$\begin{aligned}\tfrac{3}{2}((RI_d + \omega_e L_q I_q) \cdot I_d + (RI_q + K_e \omega_m - \omega_e L_d I_d) \cdot I_q) \\ = V_{DC} \cdot I_{slim} - R_{DC} \cdot I_{slim}^2\end{aligned} \quad (6)$$

Setting $I_d$ to zero in Equation (6) gives yields a quadratic equation with respect to $I_q$. Solving for $I_q$ gives roots equivalent to a positive and negative peak source current torque limit $T_{eipk}$ 131 associated with current limit $I_{slim}$ 126. That is, torque limit $T_{eipk}$ is a source current torque limit 131 that corresponds to a source current limit 126.

Similarly, $V_{DC}$ 128 has a torque limit curve based on a voltage limit equation, Equation (4). Respective direct and quadrature voltages, $V_d$ and $V_q$, are replaced with equivalents from Equations (1) and (2) in (4) to form Equation (7).

$$(RI_d + \omega_e L_q I_q)^2 + (RI_q + K_e \omega_m - \omega_e L_d I_d)^2 \leq \frac{V_{DC}^2}{3} \quad (7)$$

The maximum torques derived from supply current limit torque curves 130 and voltage limit torque curves 132 are then arbitrated in the peak torque arbitration block 134. The arbitrator 134 provides $I_{dq}$ that falls within the $I_{slim}$ requirement and the available voltage $V_{DC}$.

Figure 3:
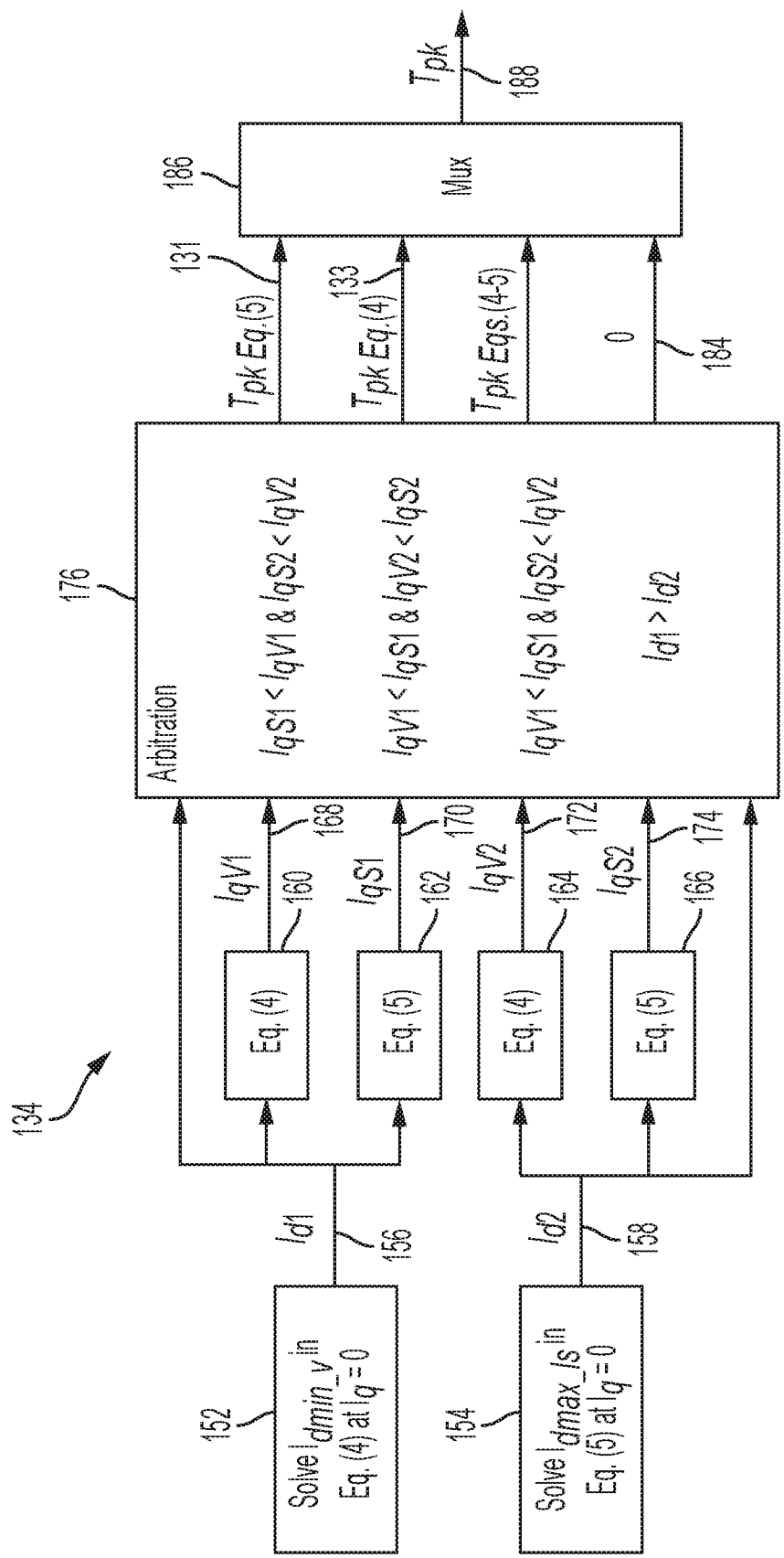
FIG. 3 illustrates a torque arbitrator in accordance with yet another aspect of the invention.

Referring to FIG. 3, a torque arbitrator 134 is shown to determine whether to use $T_{eipk}$ determined above as associated with Equation (4), Equation (5), a combination thereof, or demand torque equal to zero. In block 152, Equation (4) is solved for $I_d$ by setting the quadrature current component $I_q$ to zero as shown in Equation (8).

$$(RI_d)^2 + (K_e\omega_m - \omega_e L_d I_d)^2 = \frac{V_{DC}^2}{3} \quad (8)$$

With only $I_d$ being unknown, the resulting quadratic can be solved to determine $I_d$. As such, the direct current component root $I_{d1}$ 156 is equal to the lesser or smaller magnitude root of the equation. Similarly, Equation (5) is solved for $I_d$ by setting quadrature current component $I_q$ to zero as shown in Equation (9).

$$\tfrac{3}{2}(RI_d^2+RI_q^2-\omega_e L_d I_d I_q+K_e\omega_m I_q)=V_{DC}\cdot I_{slim}-R_{DC}\cdot I_{slim}^2 \quad (9)$$

Again, Equation (6) is a quadratic that can be solved for $I_d$ with given $I_{slim}$ 126 and $V_{DC}$ 128, resulting in direct current component root $I_{d2}$ 158 being equal to the greater or larger magnitude root of Equation (9).

The arbitration algorithm 134 then calculates acceptable values of $I_q$ based on the current limit $I_{slim}$ 126 and voltage limit $V_{DC}$ 128 in blocks 160, 162, 164, 166. That is, $I_{qV1}$, 168 is determined as the positive root of Equation (4) subjected to $I_{d1}$ in block 160 and $I_{qS1}$, 170 is determined as the positive root of Equation (5) subjected to $I_{d1}$ in block 162. Similarly, $I_{qV2}$, 172 is determined as the positive root of Equation (4) subjected to $I_{d2}$ in block 164 and $I_{qS2}$, 174 is determined as the positive root of Equation (5) subjected to in block 166 will take the positive root if the torque demand $T_d$ 136 is positive and we will take negative root if torque demand $T_d$ 136 is negative.

The resulting values are arbitrated in arbitration block 176, where if $I_{qS1}<I_{qV1}$ and $I_{qS2}<I_{qV2}$ then, the source current limit 126 is limiting the torque limit 188 of arbitration block 134. As such, the torque limit 188 is defined by the source current torque limits 131 determined above in Equations (5)-(6) such that the maximal torque based on Equation (3) subjected to the constraint of Equation (6) is the peak torque limit $T_{eipk}$ 188 associated with current $I_{slim}$ 126.

Equation (6) defines an curve in the direct-quadrature current reference frame for a given $I_{slim}$. Each point on this ellipse corresponds to a torque value based on Equation (3). The maximum value among all the torque points is defined as the peak torque limit $T_{eipk}$ 131 associated with current limit $I_{slim}$ 126.

Further, if $I_{qV1}<I_{qS1}$ and $I_{qV2}<I_{qS2}$ then, the source voltage limit 128 is limiting the torque limit 188 of arbitration block 134. As such, the torque limit 188 is defined by the source voltage torque limits 133 determined above in Equation (7) such that the maximal torque based on Equation (3) subjected to the constraint of Equations (7) are the peak torque limit $T_{eipk}$ 188 associated with voltage limit $V_{DC}$ 128.

Equation (7) defines a curve in the direct-quadrature current reference frame. Each point on this ellipse corresponds to a torque value based on Equation (3). The maximum value among all the torque points is defined as the peak source voltage torque limit $T_{evpk}$ 133 associated with $V_{DC}$ 128.

Further, if $I_{qV1}<I_{qS1}$ and $I_{qS2}<I_{qV2}$ then, according to this bisection of the motor 102 operation, the source voltage limit 128 and source current limit 126 are limiting the torque limit 188 of arbitration block 134. As such, the torque limit 188 is defined by the intersection of Equations (4)-(5) when subjected to a sweep of $I_d$ from $I_{d1}$ to $I_{d2}$. That is, when the roots from Equation (4) are equal to the roots of Equation (5) for the same $I_d$ value, the torque limit 188 is equal to those roots. The span $I_d$ values is from $I_{d1}$ to $I_{d2}$. As such, the source current torque limit 131 is equal to the source voltage torque limit 133 according to the intersection of curves when $I_{qV1}<I_{qS1}$ and $I_{qS2}<I_{qV2}$.

And finally, if $I_{d1}>I_{d2}$ then the torque limit 188 is zero and the electric machine 102 will be operated with zero torque.

The controller 40 algorithm continues by limiting to torque requested from the rest of the control method to the lesser of the torque limit 188 and the torque demand $T_d$ 136. That is, the controller 40 will output the torque associated with the torque demand $T_d$ 136 unless the torque peak limit 188 is less than the torque demand $T_d$ 136. Indeed, the inverter 112 will generate an alternating current 110 that corresponds to the torque demand $T_d$ 136 and according to the torque limit 188 that is defined by the source current torque limit 131 that corresponds to the source current limit 126.

Referring back to FIG. 2, the torque demand $T_d$ 136 may be input to a maximum torque per ampere block for providing a torque output that can be generated with the least amount of current to a maximum torque per voltage block as known in the art. As such, the control method 124 outputs current commands $I_{dq}^*$, 144 to the current control block 148, which provides input to the duty cycle generator block 150.

Figure 4:
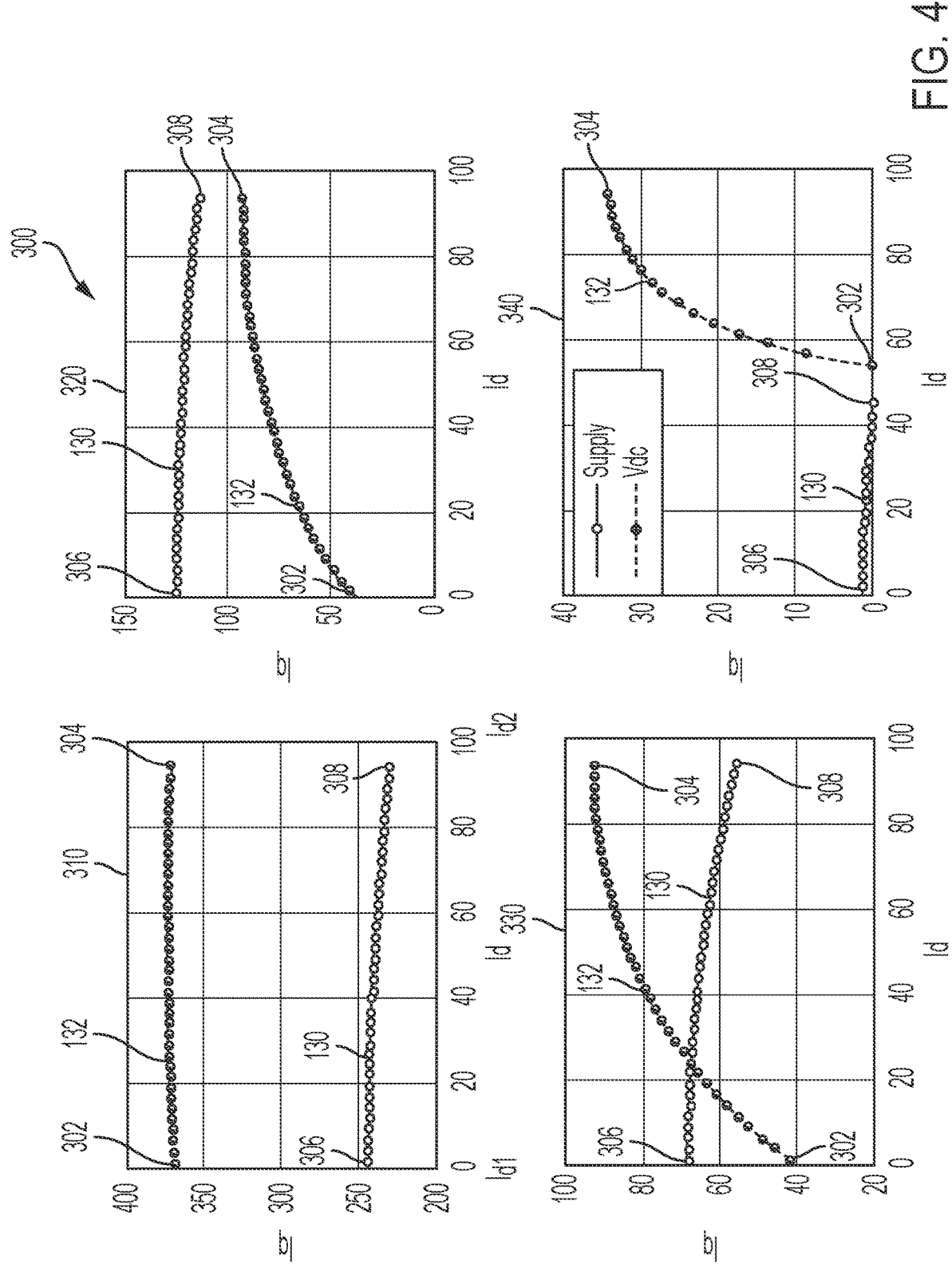
FIG. 4 graphically illustrates an arbitration block in accordance with still yet another aspect of the invention.

Referring to FIG. 4, a graph 300 of the arbitration block 134 is shown. Graph 300 includes a first current limit based quadrature current root $I_{qS1}$ 306, a first voltage limit based quadrature current root $I_{qV1}$ 302, a second current limit based quadrature current root $I_{qS2}$ 308, and a second voltage limit based quadrature current root $I_{qV2}$ 304. As such, $I_{qS1}<I_{qV1}$ and $I_{qS2}<I_{qV2}$ is shown in graph 310, where each of the respective $I_q$ values are calculated based on respective $I_{d1}$ and $I_{d2}$ values.

Graph 320 depicts $I_{qV1}$ 302$<I_{qS1}$ 306 and $I_{qV2}$ 304$<I_{qS2}$ 308 where each of the respective $I_q$ values are calculated based on respective $I_{d1}$ and $I_{d2}$ values.

Graph 330 depicts $I_{qV1}$ 302$<I_{qS1}$ 306 and $I_{qS2}$ 308$<I_{qV2}$ 304 where each of the respective $I_q$ values are calculated based on respective $I_{d1}$ and $I_{d2}$ values.

Graph 340 depicts $I_{d1}>I_{d2}$ where $I_{qV1}$, $I_{qS1}$, $I_{qS2}$, $I_{qV2}$ relationships are undefined and the output of the arbitration block 176 is zero, as indicated by arrow 184. It should be appreciated that the nomenclature and variable assignments may be interchanged or arranged to change the algorithm output function. The naming convention, syntactical representations, and other arrangements of the equations listed herein are not intended to be limiting.

Embodiments described herein can be part of a steering system such as an electrical power steering (EPS), driver assistance system and/or vehicle control system (e.g., autonomous or semi-autonomous steering system). It is noted that the embodiments described herein may be employed in conjunction with any device or system that utilizes an electric motor or motors.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to

Having thus described the invention, it is claimed:

1. An electric motor drive system comprising:
   an electric machine having a rotor having permanent magnets arranged therein and a stator surrounding the rotor;
   an inverter having switches arranged therein, the switches operable to draw current from a direct current bus and operate the electric machine through windings of the stator; and
   a controller operable to:
      receive a source current limit, $I_{slim}$, and a source voltage limit, $V_{DC}$, both associated with the direct current bus,
      determine a source current torque limit based on the source current limit, $I_{slim}$;
      determine a source voltage torque limit based on the source voltage limit, $V_{DC}$;
      determine the source current torque limit being less than the source voltage torque limit;
      determine a torque limit based on the source current torque limit in response to determining the source current torque limit being less than the source voltage torque limit; and
      responsive to a torque demand, operate the switches of the inverter to generate an alternating current corresponding to the torque demand and according to the torque limit.

2. The electric motor drive system of claim 1, wherein the controller is further operable to:
   determine a first d-axis current, based on the source voltage limit, $V_{DC}$;
   determine a first current limit-based quadrature current root, $I_{qS1}$, based on the first d-axis current, $I_{d1}$;
   determine a first voltage limit-based quadrature voltage root, $I_{qV1}$, based on the first d-axis current, $I_{d1}$;
   determine a second d-axis current, $I_{d2}$ based on the source current limit, $I_{slim}$;
   determine a second current limit-based quadrature current root, $I_{qS2}$, based on the second d-axis current, $I_{d2}$;
   determine a second voltage limit-based quadrature voltage root, $I_{qV2}$, based on the second d-axis current, $I_{d2}$;
   wherein determining the source current torque limit being less than the source voltage torque limit further includes: determining the first current limit-based quadrature current root, $I_{qS1}$, being less than the first voltage limit-based quadrature voltage root, $I_{qV1}$, and determining the second current limit-based quadrature current root, $I_{qS2}$, being less than the second voltage limit-based quadrature voltage root, $I_{qV2}$.

3. The electric motor drive system of claim 2, wherein determining the first current limit-based quadrature current root, $I_{qS1}$ includes solving a source power limit equation to determine a positive root and a negative root; and
   wherein the first current limit-based quadrature current root, $I_{qS1}$ is the positive root of the source power limit equation when a quadrature current component is zero.

4. The electric motor drive system of claim 3, wherein the torque limit is based on a maximum numerical solution of direct-quadrature current pairs associated with the source power limit equation and a torque equation, $T_e = \frac{3}{2} K_e I_q + \frac{3}{4} N_p (L_q - L_d) I_d I_s$, where $T_e$ is a torque of the electric machine, $K_e$ is a back electromagnetic force constant of the electric machine, $I_d$ and $I_q$ are direct-axis current and quadrature-axis current, respectively, and $L_d$ is a direct axis inductance of the electric machine and $N_p$ is a number of poles of the electric machine.

5. The electric motor drive system of claim 3, wherein determining the second current limit-based quadrature current root, $I_{qS2}$ includes solving a source power limit equation to determine a positive root and a negative root; and
   wherein the second current limit-based quadrature current root, $I_{qS2}$ is the positive root of the source power limit equation when a quadrature current component is zero.

6. The electric motor drive system of claim 2, wherein determining the first d-axis current, $I_{d1}$, includes solving a source power limit equation to determine two roots, each having a magnitude; and
   wherein the first d-axis current, $I_{d1}$ is equal to one of the two roots having a smaller magnitude.

7. The electric motor drive system of claim 2, wherein determining the second d-axis current, $I_{d2}$, includes solving a source power limit equation to determine two roots, each having a magnitude; and
   wherein the second d-axis current, $I_{d2}$ is equal to one of the two roots having a larger magnitude.

8. The electric motor drive system of claim 2, wherein determining the first voltage limit-based quadrature current root, $I_{qV1}$ includes solving a source voltage limit equation to determine a positive root and a negative root; and
   wherein the first voltage limit-based quadrature current root, $I_{qV1}$ is the positive root of the source voltage limit equation when a quadrature current component is zero.

9. The electric motor drive system of claim 2, wherein determining the second voltage limit-based quadrature current root, $I_{qV2}$ includes solving a source voltage limit equation to determine a positive root and a negative root; and
   wherein the second voltage limit-based quadrature current root, $I_{qV2}$ is the positive root of the source voltage limit equation when a quadrature current component is zero.

10. The electric motor drive system of claim 1, wherein the controller is further operable to:
    determine the torque limit based on the source voltage torque limit in response to determining the source current voltage limit being less than the source current torque limit;
    determine a first d-axis current, $I_{d1}$, based on the source voltage limit, $V_{DC}$;
    determine a first current limit-based quadrature current root, $I_{qS1}$, based on the first d-axis current, $I_{d1}$;
    determine a first voltage limit-based quadrature voltage root, $I_{qV1}$, based on the first d-axis current, $I_{d1}$;
    determine a second d-axis current, $I_{d2}$, based on the source current limit, $I_{slim}$;
    determine a second current limit-based quadrature current root, $I_{qS2}$, based on the second d-axis current, $I_{d2}$;
    determine a second voltage limit-based quadrature voltage root, $I_{qV2}$, based on the second d-axis current, $I_{d2}$;
    wherein determining the source voltage torque limit being less than the source current torque limit further includes: determining the first voltage limit-based quadrature voltage root, $I_{qV1}$, being less than the first current limit-based quadrature current root, $I_{qS1}$, and determining the second voltage limit-based quadrature voltage root, $I_{qV2}$, being less than the second current limit-based quadrature current root, $I_{qS2}$.

11. The electric motor drive system of claim 10, wherein determining the first current limit-based quadrature current root, $I_{qS1}$ includes solving a source power limit equation to determine a positive root and a negative root; and wherein the first current limit-based quadrature current root, $I_{qS1}$ is the positive root of the source power limit equation when a quadrature current component is zero.

12. The electric motor drive system of claim 10, wherein determining the second current limit-based quadrature current root, $I_{qS2}$ includes solving a source power limit equation to determine a positive root and a negative root; and
wherein the second current limit-based quadrature current root, $I_{qS2}$ is the positive root of the source power limit equation when a quadrature current component is zero.

13. The electric motor drive system of claim 10, wherein determining the first voltage limit-based quadrature current root, $I_{qV1}$ includes solving a source voltage limit equation to determine a positive root and a negative root; and
wherein the first voltage limit-based quadrature current root, $I_{qV1}$ is the positive root of the source voltage limit equation when a quadrature current component is zero.

14. A method of operating an electric machine, comprising:
determining a source current torque limit based on a source current limit of a direct current bus;
determining a source voltage torque limit based on a source voltage limit of the direct current bus;
determining a first d-axis current, $I_{d1}$, based on the source voltage limit and corresponding to a q-axis current component, $I_q=0$;
determining a first current limit-based quadrature current root, $I_{qS1}$, based on the first d-axis current, $I_{d1}$;
determining a first voltage limit-based quadrature voltage root, $I_{qV1}$, based on the first d-axis current, $I_{d1}$;
determining a second d-axis current, $I_{d2}$, based on the source current limit, and corresponding to a q-axis current component, $I_q=0$;
determining a second current limit-based quadrature current root, $I_{qS2}$, based on the second d-axis current, $I_{d2}$;
determining a second voltage limit-based quadrature voltage root, $I_{qV2}$, based on the second d-axis current, $I_{d2}$; and
determining a final torque limit for the electric machine based on comparing the first current limit-based quadrature current root, $I_{qS1}$, to the first voltage limit-based quadrature voltage root, $I_{qV1}$, and based on comparing the second current limit-based quadrature current root, $I_{qS2}$, to the second voltage limit-based quadrature voltage root, $I_{qV2}$.

15. The method of claim 14, further comprising:
determining an intersection of a source voltage limit constraint equation and a source current limit equation over a range of d-axis currents from the first d-axis current, $I_{d1}$, to the second d-axis current, $I_{d2}$, and
wherein determining the final torque limit for the electric machine includes determining the final torque limit based on the intersection of the source voltage limit constraint equation and the source current limit equation in response to determining the first voltage limit-based quadrature voltage root, $I_{qV1}$, being less than the first current limit-based quadrature current root, $I_{qS1}$, and the second current limit-based quadrature current root, $I_{qS2}$, being less than the second voltage limit-based quadrature voltage root, $I_{qV2}$.

16. The method of claim 14, further comprising: wherein determining the final torque limit for the electric machine includes determining the final torque limit based on the source current torque limit in response to determining the first current limit-based quadrature current root, $I_{qS1}$, being less than the first voltage limit-based quadrature voltage root, $I_{qV1}$, and the second current limit-based quadrature current root, $I_{qS2}$, being less than the second voltage limit-based quadrature voltage root, $I_{qV2}$.

17. The method of claim 14, further comprising: wherein determining the final torque limit for the electric machine includes determining the final torque limit based on the source voltage torque limit in response to determining the first voltage limit-based quadrature current root, $I_{qV1}$, being less than the first current limit-based quadrature voltage root, $I_{qS1}$, and the second voltage limit-based quadrature current root, $I_{qV2}$, being less than the second current limit-based quadrature voltage root, $I_{qS2}$.

18. The method of claim 14, further comprising: wherein determining the final torque limit for the electric machine includes setting the final torque limit to zero in response to determining the first d-axis current, $I_{d1}$, being greater than the second d-axis current, $I_{d2}$.

19. An electric motor drive system comprising:
an electric machine having a rotor having permanent magnets arranged therein and a stator surrounding the rotor;
an inverter having switches arranged therein, the switches operable to draw current from a direct current bus and operate the electric machine through windings of the stator; and
a controller operable to:
receive a source current limit, $I_{slim}$, and a source voltage limit, $V_{DC}$, both associated with the direct current bus, determine a source current torque limit based on the source current limit, $I_{slim}$;
determine a source voltage torque limit based on the source voltage limit, $V_{DC}$;
determine the source voltage torque limit being less than the source current torque limit;
determine a torque limit based on the source voltage torque limit in response to determining the source voltage torque limit being less than the source current torque limit; and
responsive to a torque demand, operate the switches of the inverter to generate an alternating current corresponding to the torque demand and according to the torque limit.

20. The electric motor drive system of claim 19, wherein the controller is further operable to:
determine a first d-axis current, Li, based on the source voltage limit, $V_{DC}$;
determine a first current limit-based quadrature current root, $I_{qS1}$, based on the first d-axis current, $I_{d1}$;
determine a first voltage limit-based quadrature voltage root, $I_{qV1}$, based on the first d-axis current, $I_{d1}$;
determine a second d-axis current, $I_{d2}$, based on the source current limit, $I_{slim}$;
determine a second current limit-based quadrature current root, $I_{qS2}$, based on the second d-axis current, $I_{d2}$;
determine a second voltage limit-based quadrature voltage root, $I_{qV2}$, based on the second d-axis current, $I_{d2}$;
wherein determining the source voltage torque limit being less than the source current torque limit further includes: determining the first current limit-based quadrature current root, $I_{qS1}$, being greater than the first voltage limit-based quadrature voltage root, $I_{qV1}$, and determining the second current limit-based quadrature current root, $I_{qS2}$, being greater than the second voltage limit-based quadrature voltage root, $I_{qV2}$.

* * * * *